US009934927B1

(12) United States Patent
Qazilbash et al.

(10) Patent No.: US 9,934,927 B1
(45) Date of Patent: Apr. 3, 2018

(54) INFRARED LIGHT GENERATING SYSTEM

(71) Applicant: College of William and Mary, Williamsburg, VA (US)

(72) Inventors: M. Mumtaz Qazilbash, Williamsburg, VA (US); David J. Lahneman, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 0 days.

(21) Appl. No.: 15/666,974

(22) Filed: Aug. 2, 2017

(51) Int. Cl.

| | |
|---|---|
| ***H04N 5/33*** | (2006.01) |
| ***G01J 5/10*** | (2006.01) |
| ***B01J 19/12*** | (2006.01) |
| ***H01J 17/28*** | (2006.01) |
| ***H01J 17/16*** | (2012.01) |
| ***H01J 17/20*** | (2012.01) |
| *H01J 17/06* | (2006.01) |
| *H01J 17/10* | (2006.01) |

(52) U.S. Cl.
CPC .............. *H01J 17/28* (2013.01); *H01J 17/16* (2013.01); *H01J 17/20* (2013.01); *H01J 17/06* (2013.01); *H01J 17/10* (2013.01)

(58) Field of Classification Search
CPC .. H01J 17/28; H01J 17/16; H01J 17/20; H01J 17/10; H01J 17/06
See application file for complete search history.

(56) References Cited

U.S. PATENT DOCUMENTS 5,075,552 A * 12/1991 McClelland ........... G01N 21/71 250/339.03
8,969,841 B2 3/2015 Smith
9,341,567 B2 * 5/2016 Nakayama ............. B82Y 20/00
2012/0236155 A1 * 9/2012 Nakayama ............. B82Y 20/00 348/164
2014/0240509 A1 * 8/2014 Nakayama ............. B82Y 20/00 348/162

OTHER PUBLICATIONS

McIntosh et al., "High resolution Fourier transform infrared spectroscopy using a high temperature argon arc source", Infrared Physics and Technology (2001), vol. 32, pp. 509-514.
Bridges et al., "Characterization of argon arc source in the infrared", Metrologia (1995/96), vol. 32, pp. 625-628.
Bridges et al., "Vacuum ultraviolet radiometry. 3: The argon mini-arc as a new secondary standard of spectral radiance", Applied Optics (1977), vol. 16, pp. 367-376.

* cited by examiner

*Primary Examiner* — Tracie Y Green
(74) *Attorney, Agent, or Firm* — Jason P. McDevitt

(57) ABSTRACT

A system for generating infrared light includes a sealed housing and a noble gas filling the housing. A window disposed in a wall of the housing is transparent to infrared radiation. Two electrodes, disposed in the housing, are aligned along a common longitudinal axis adapted to be approximately perpendicular to a local force of gravity. A gap is defined between the electrodes along the longitudinal axis. Obstruction(s), disposed in the housing adjacent to the gap between the electrodes, extend along the length of the gap. The obstruction(s) define a convection space between the electrodes. The convection space has a dimension, measured perpendicular to the longitudinal axis, in the range of 2 to 10 times the length of the gap. An electric current source is coupled to the electrodes.

23 Claims, 5 Drawing Sheets

INFRARED LIGHT GENERATING SYSTEM

STATEMENT REGARDING FEDERALLY SPONSORED RESEARCH AND DEVELOPMENT

This invention was made with government support under Grant No. DMR-1255156 awarded by the National Science Foundation. The government has certain rights in the invention.

FIELD OF INVENTION

The field of the invention relates generally to infrared light sources, and more particularly to an infrared light generating system for generating infrared light in the far to mid-infrared spectral range including the terahertz spectral range.

BACKGROUND OF THE INVENTION

Circumventing the diffraction limit of light using scattering-type scanning optical microscopy (S-SNOM) has proven to be a powerful technique for probing the local nanoscale optical properties of solids. Its recent applications as a nano-imaging tool have employed mid-infrared frequencies while circumventing the diffraction limit by nearly three orders of magnitude. By using broadband illumination with asymmetric Fourier transform infrared (FTIR) spectroscopy, observation of the local near-field spectra with nanometer scale spatial resolution has been realized. S-SNOM is based on operating an atomic force microscope (AFM) in tapping mode in which light is focused on to the AFM's metallic tip in close proximity to a sample being examined. The tip-sample interaction is encoded in the scattered signal which is then measured with a detector. Since the ratio of the scattered signal to incoming light at the tip is so small, it is necessary to use high intensity light sources.

Broadband nano-spectroscopy in the far and mid-infrared spectral range is challenging because of the limitations of existing high-intensity light sources. The use of tunable, monochromatic lasers allows for high signal strength, but is limited by the available wavelengths and by the amount of time that it takes to obtain a high-resolution broadband spectrum. Quantum cascade lasers (QCLs) have been implemented with S-SNOM and have the ability to quickly scan through wavelengths, but have a narrow spectral range. Difference frequency generation provides a stable high-intensity beam in the mid-infrared, but needs to be tuned to different wavelength ranges to get the full spectrum and currently has a low frequency cutoff of approximately 550 $cm^{-1}$. Thermal blackbody light sources like the globar provide a large spectral bandwidth, but only at low intensities. Hence, significant integration time is required to obtain data with a globar and there is no usable intensity below approximately 750 $cm^{-1}$ for broadband S-SNOM. Synchrotron light sources provide spatially coherent intense broadband light that is currently the highest intensity and widest bandwidth infrared source for nano-spectroscopy. However, synchrotron systems are large and expensive systems. Furthermore, there are only a handful of synchrotrons in the world that have far-infrared and mid-infrared beamlines. Accordingly, access to far-infrared to mid-infrared beam lines is competitive such that they not readily available for more time-consuming experiments.

The most common type of commercial plasma light sources are the xenon-filled high-pressure plasma lamps which are useful as the broadband source for the near-infrared, visible, and ultraviolet spectral ranges, i.e., all having frequencies higher than 2,500 $cm^{-1}$. However, these lamps do not provide intensity in the mid and far-infrared since the plasma is encased in a quartz bulb that is opaque to these wavelengths.

Infrared spectroscopy has been commonly used to probe infrared-active phonons and charge dynamics in materials. However, many materials have been shown to exhibit phase coexistence at length scales much smaller than the diffraction limit of infrared light. Infrared nano-spectroscopy techniques are necessary to properly understand the charge and lattice dynamics of these nano-domains that exist in a number of materials. To have the ability to probe nanoscale domains with broadband infrared spectroscopy in the far-infrared and mid-infrared spectral ranges would allow these types of experiments to be performed on a number of materials to discover and explore nanoscale phenomena that may also have significant potential for applications. Researchers will be able to probe the crystallinity of thin films over a broad spectral range, allowing the testing of the effectiveness of different growth methods. Moreover, the technique can be employed for nanoscale identification of materials, and quality control and characterization of nano-devices.

To summarize, S-SNOM allows spectroscopic investigation of materials at length scales much smaller than the diffraction limit of light. Accordingly, S-SNOM has enormous potential as a spectroscopy tool in the infrared spectral range where it can probe phonon resonances and carrier dynamics at the nanometer length scales. However, S-SNOM processes are limited by the lack of practical and affordable table-top light sources emitting intense broadband infrared radiation in the 100 $cm^{-1}$ to 2,500 $cm^{-1}$ spectral range indicative of the far to mid-infrared spectral range.

BRIEF SUMMARY OF THE INVENTION

Accordingly, it is an object of the present invention to provide an infrared light generating system that can generate broadband infrared light in the far-infrared to mid-infrared spectral range.

In accordance with the present invention, a system for generating infrared light includes a sealed housing and a noble gas filling the housing. A window disposed in a wall of the housing is transparent to infrared radiation. A pair of electrodes is disposed in the housing. The electrodes are aligned along a common longitudinal axis adapted to be approximately perpendicular to a local force of gravity. A gap is defined between the electrodes along the longitudinal axis. At least one obstruction is disposed in the housing adjacent to the gap between the electrodes. The obstruction (s) extend along the length of the gap. The obstruction(s) define a convection space between the electrodes. The convection space has a dimension, measured perpendicular to the longitudinal axis, in the range of 2 to 20 times the length of the gap. An electric current source is coupled to the electrodes.

BRIEF DESCRIPTION OF THE DRAWINGS

The summary above, and the following detailed description, will be better understood in view of the drawings that depict details of preferred embodiments.

DETAILED DESCRIPTION OF THE INVENTION

Figure 1:
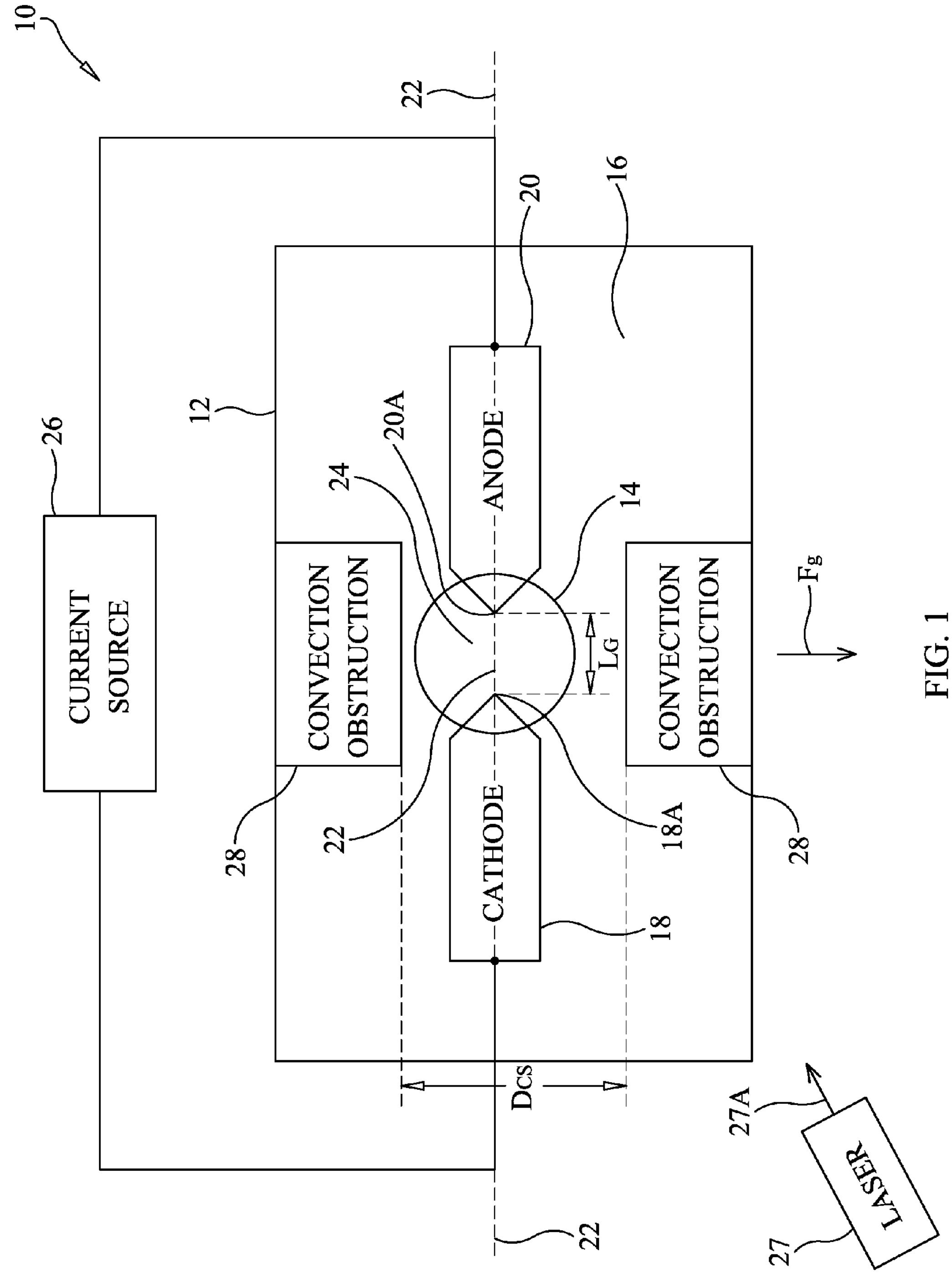
FIG. 1 is a schematic view of an infrared light generating system in accordance with an embodiment of the present invention.

Referring now to the drawings and more particularly to FIG. 1, an infrared (IR) light generating system in accordance with an embodiment of the present invention is shown and is referenced generally by numeral 10. IR light generating system 10 is a simple system capable of generating/emitting IR light in the far-infrared to mid-infrared spectral range. As such, IR light generating system 10 will be a useful tool in all forms of IR spectroscopy to include far and mid-infrared spectroscopy, micro-spectroscopy, and nano-spectroscopy. The present invention could also be used as an IR light source for use in far and mid-infrared ellipsometry.

IR light generating system 10 includes a housing 12 having one or more windows 14 disposed in a wall of housing 12. Housing 12 with window(s) 14 define a sealed vessel whose interior volume 16 is filled with a noble gas such as argon, neon, krypton, or xenon. In general, material (s) used for housing 12 will be opaque with respect to the IR light while material(s) used for window 14 will be transparent with respect to IR light and, specifically, transparent with respect to IR light in the far-infrared to mid-infrared spectral range. For example, window 14 can be a diamond window, a potassium bromide window, or a zinc selenide window. The construction of housing 12 with window 14 can be accomplished in a variety of ways without departing from the scope of the present invention.

Disposed within housing 12 is a pair of electrodes that, more specifically, includes a cathode 18 and an anode 20 that are arranged/aligned along a common longitudinal axis referenced by dashed line 22. Cathode 18 and anode 20 can be made from tungsten as would be understood in the art. The tip 18A of cathode 18 is spaced apart from the tip 20A of anode 20 with the resulting gap 24 between tips 18A and 20A having a length "$L_G$" along longitudinal axis 22. The length of gap 24 is exaggerated for clarity of illustration. For reasons that will be explained further below, IR light generating system 10 is oriented such that longitudinal axis 22 is perpendicular to a local force of gravity "$F_g$". A current source 26 is coupled to cathode 18 and anode 20. Briefly and as will be explained in greater detail below, an electric current pulse supplied to cathode 18 and anode 20 causes an arc discharge at gap 24 that can then be sustained as an IR light-emitting plasma by a DC current applied to cathode 18 and anode 20. The IR light-emitting plasma could also be sustained by a laser light beam focused on the plasma in which case the DC current would not be required. For example, a laser 27 can be positioned outside of housing 12 such that its laser light beam 27A is directed through a window 14 of housing 12.

The sustained plasma (not shown) is forced upwards due to convection that, in turn, leads to spatial instability of the plasma as a function of time causing what is known as "arc-flutter". Ultimately, arc-flutter leads to a time-variation of the emitted light which is not suitable for spectroscopy experiments. The IR light generating system of the present invention limits such plasma instability by disposing one or more obstruction(s) 28 in housing 12 to limit convection-driven agitation of the plasma generated in gap 24. Convection obstructions 28 suppress convection and improve the spatial stability of the plasma that leads to a stable, continuous, time-independent light output. In general, convection obstructions 28 are disposed in housing 12 adjacent to gap 24 and at least all along the length $L_G$ of gap 24. Obstructions 28 can be coupled to or integrated with housing 12 without departing for the scope of the present invention. The convection space defined between obstructions 28 at gap 24 can be defined by a convection space dimension "$D_{CS}$" that is perpendicular to longitudinal axis 22, i.e., aligned with the local force of gravity $F_g$. For purposes of the present invention, the convection space dimension $D_{CS}$ is in the range of 2 to 20 times the length $L_G$ of gap 24. Practically, the convection space dimension $D_{CS}$ also has to be larger than the diameter of the electrodes (i.e., typically, the diameter of the anode is most critical since the anode is the electrode with the larger diameter). The convection space dimension needs to be only slightly larger than the anode diameter to insure that the electrode does not come into contact with the convection obstructions that define the convection space.

Figure 2:
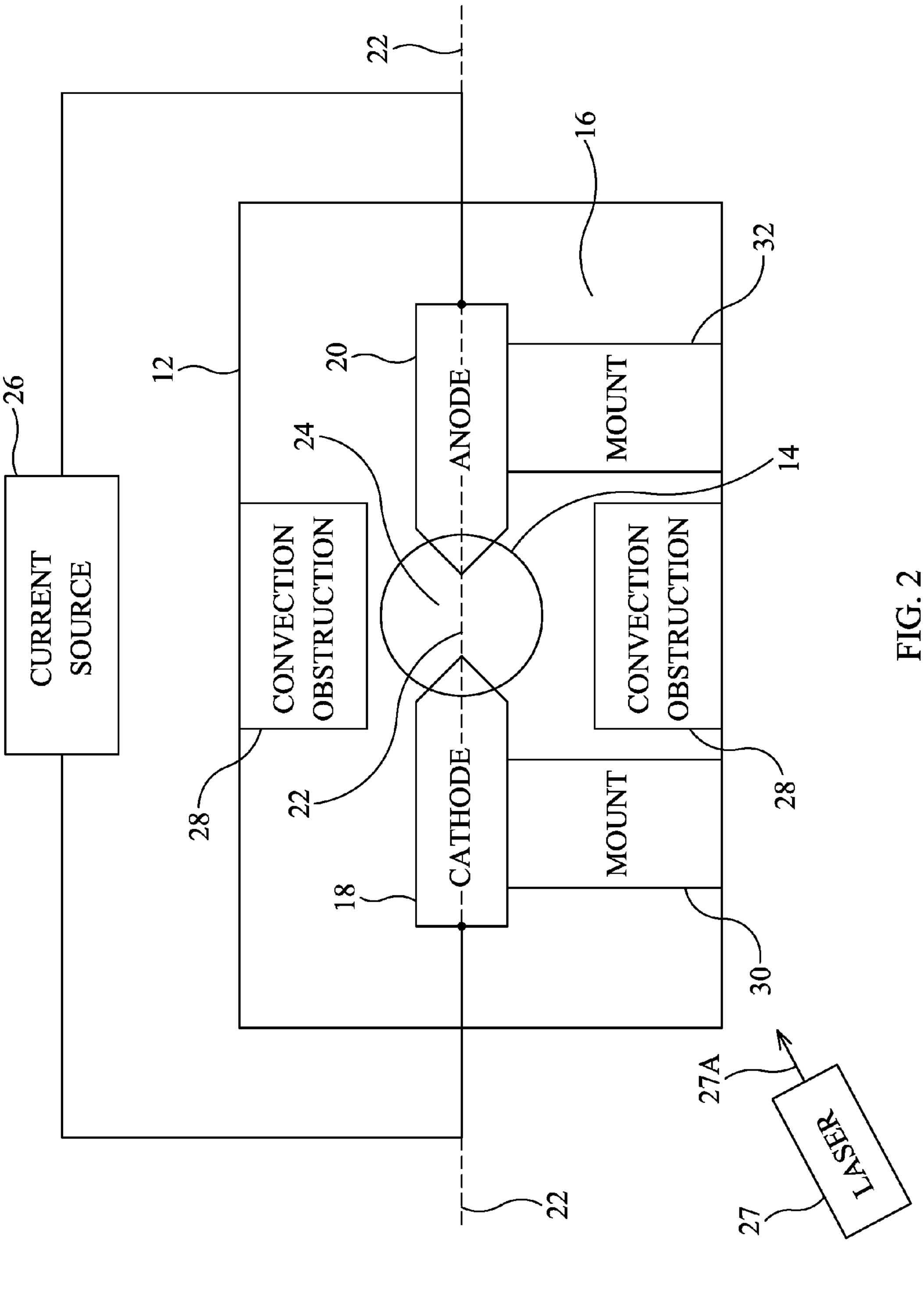
FIG. 2 is a schematic view of an infrared light generating system with its electrodes thermally coupled to and electrically insulated from the system's housing in accordance with another embodiment of the present invention.

As mentioned above, housing 12 is opaque with respect to IR light. Suitable materials for housing 12 include metal, composites, etc. that can withstand the temperatures generated by an IR light-emitting plasma. For ease of construction and cost efficiency, housing 12 can be made from a readily-available metal or metal alloy (e.g., aluminum, copper, brass, stainless steel, etc.). The electrical conductivity associated with such readily-available metals requires that cathode 18 and anode 20 be electrically isolated within housing 12. At the same time, the heat generated within housing 12 by a sustained plasma requires that cathode 18 and anode 20 be thermally coupled to a heat sink to maintain their operating efficacy. In such a case and as illustrated in FIG. 2, each of the electrodes (i.e., cathode 18 and anode 20) is supported in housing 12 by a corresponding mount 30 and 32, respectively. Each mount 30 and 32 electrically insulates each respective electrode from housing 12 while thermally coupling the respective electrode to housing 12. Mounts 30 and 32 can be constructed in a variety of ways without departing from the scope of the present invention. By way of an illustrative example, a mounting arrangement for the electrodes will be explained later herein.

Figure 3:
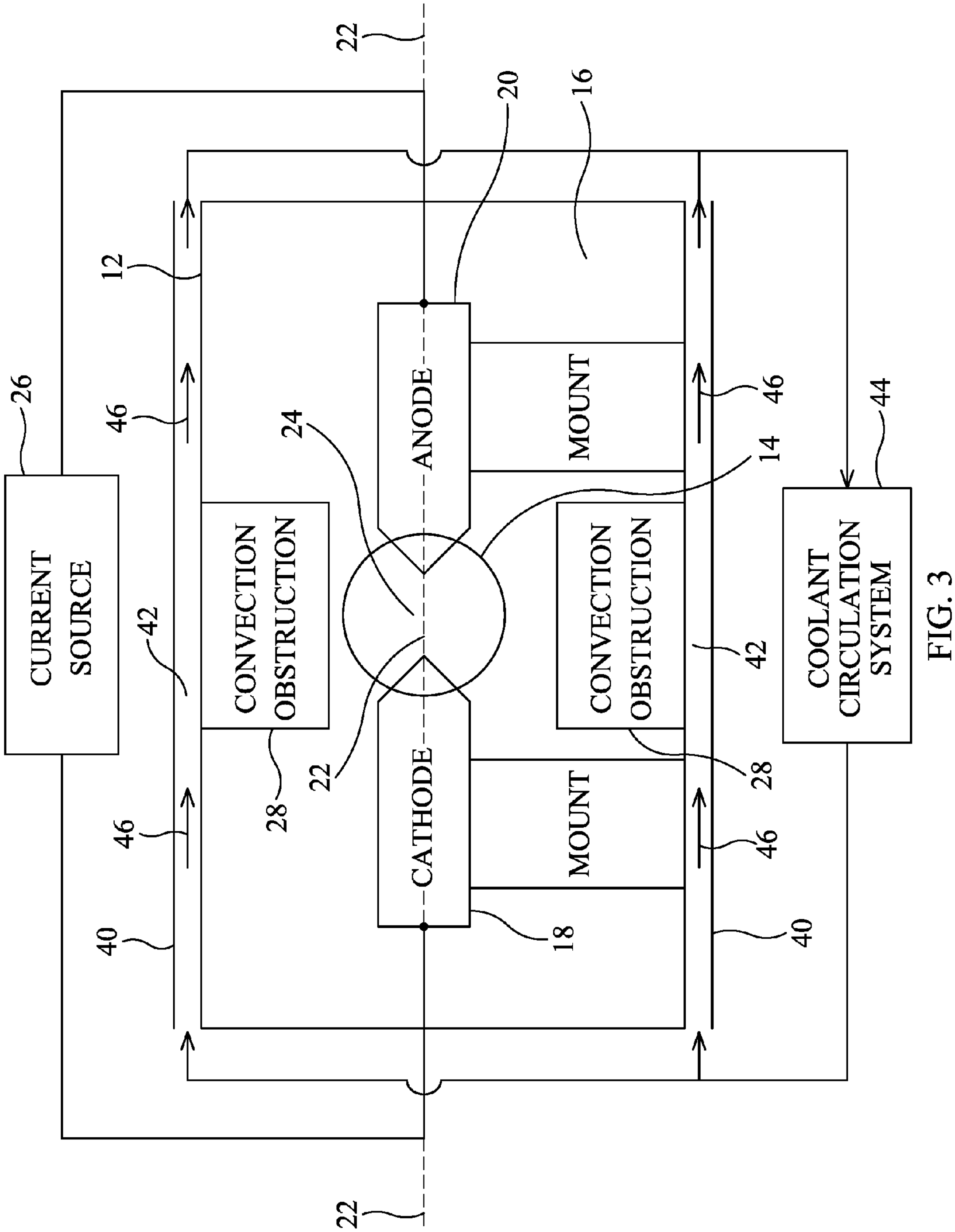
FIG. 3 is a schematic view of an infrared light generating system with a cooling jacket disposed about the system's housing in accordance with another embodiment of the present invention.

In order to facilitate cooling of the IR light generating system, it may be desirable to couple a passive or active cooling system to housing 12. For example and as illustrated in FIG. 3, a jacket 40 could be disposed adjacent to some or all of housing 12 with jacket 40 defining one or more flow regions 42 between jacket 40 and the outer surface of housing 12. A coolant circulation system 44 can provide a flow of a coolant (referenced by arrows 46) through flow regions 42.

Figure 4:
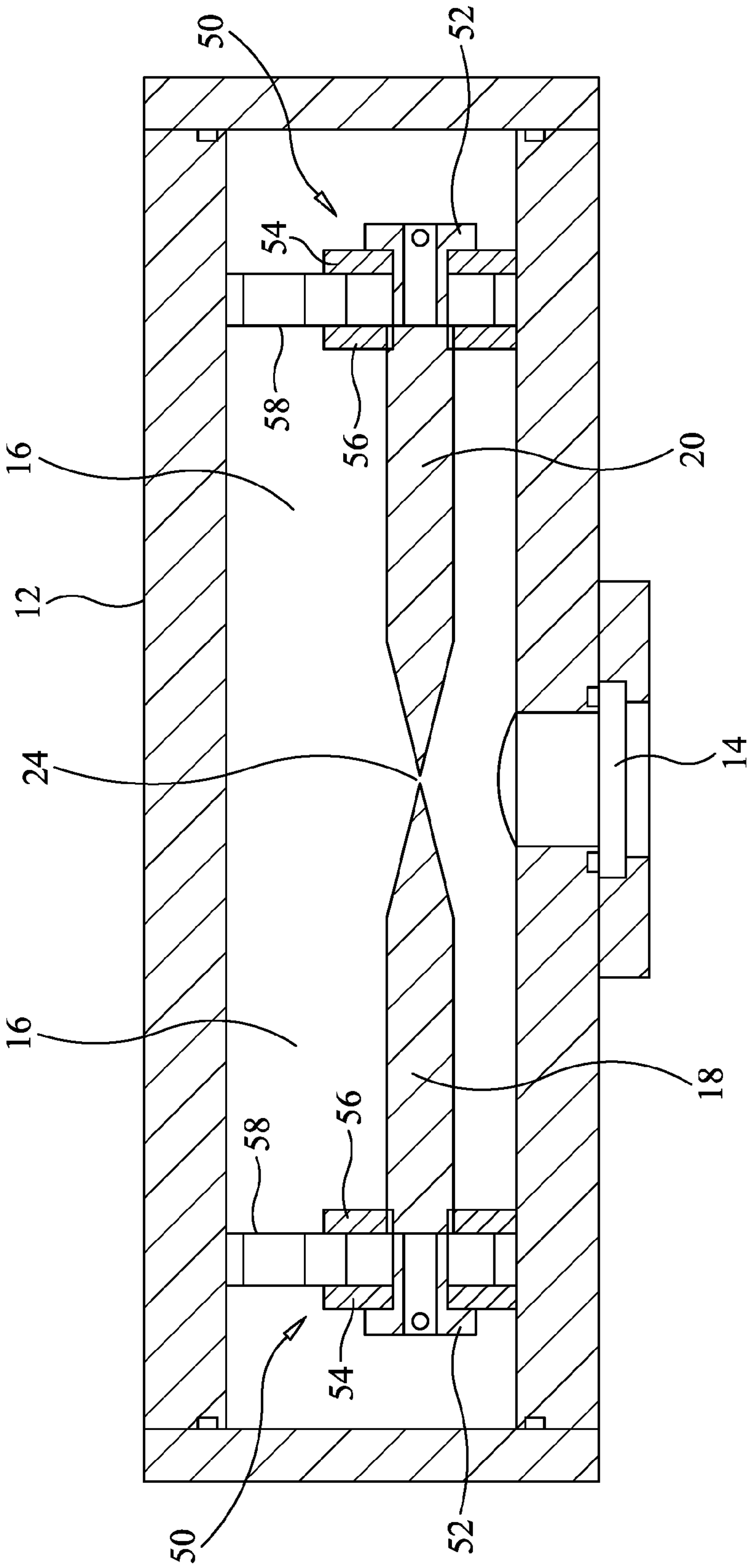
FIG. 4 is a cross-sectional view of an infrared light generating system illustrating electrode mounts in accordance with an embodiment of the present invention.
Figure 5:
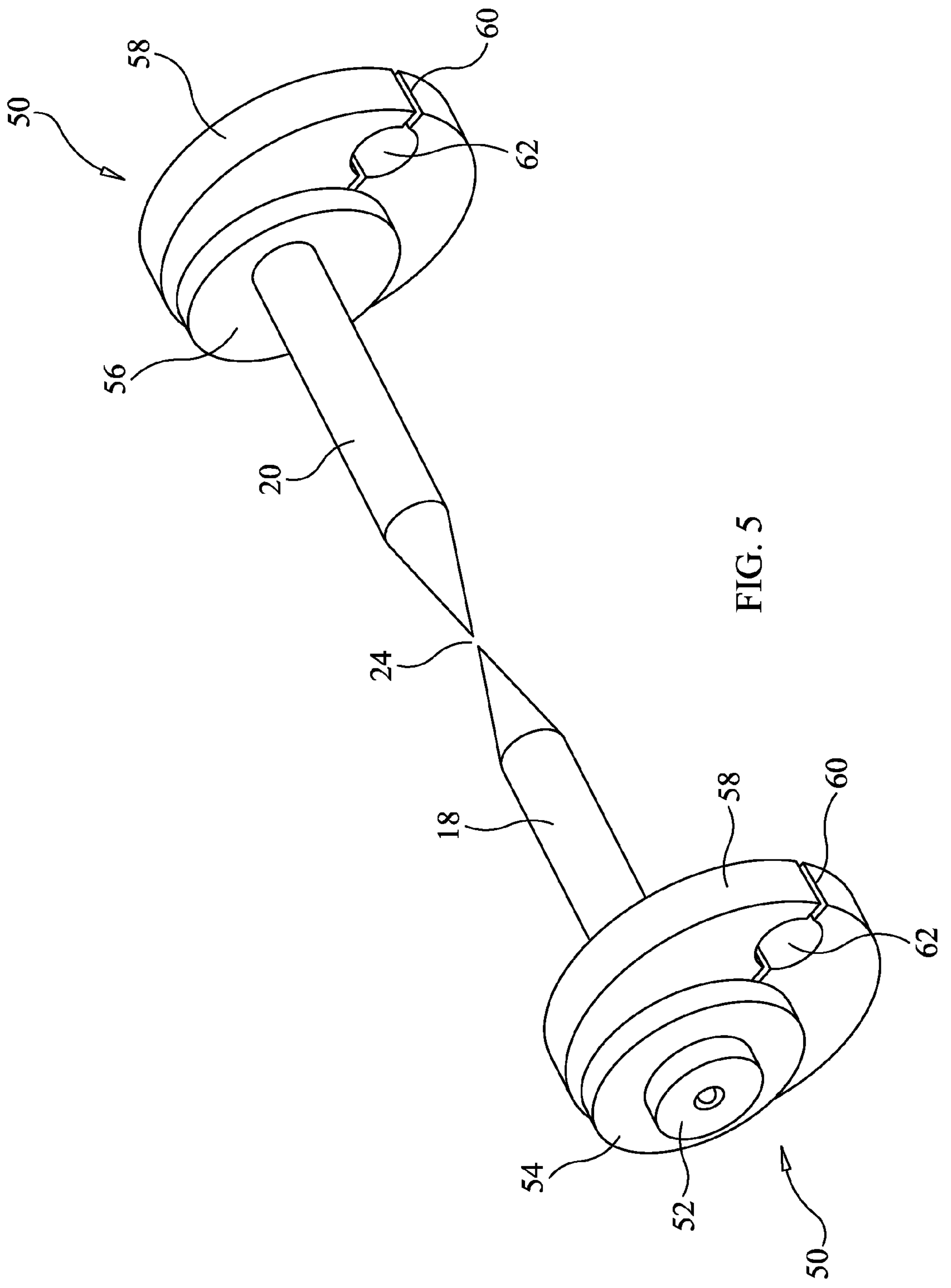
FIG. 5 is an isolated perspective view of the two electrodes and their respective electrode mounts shown in FIG. 4.

As mentioned above, a variety of thermally-conductive and electrically-insulating mounts can be used to support the electrodes in the IR light generating system of the present invention. By way of an illustrative example, an embodiment of a thermally-conductive and electrically-insulating electrode mounting assembly 50 is shown installed in housing 12 (FIG. 4) and in isolation (FIG. 5). Electrode mounting assembly 50 is the same for each of cathode 18 and anode 20. Each assembly 50 includes an electrically-conductive bushing 52 that provides electrical coupling between a lead (not shown) from the previously-described current source 26 to cathode 18 or anode 20. Electrically-insulating ceramic washers 54 and 56 are sandwiched about a thermally-conductive electrode mount 58. Mount 58 provides physical support for cathode 18 or anode 20, and provides the thermal coupling of cathode 18 or anode 20 to housing 12. Cathode 18 and anode 20 are electrically isolated from mount 58. In the illustrated embodiment, electrode mount 58 is partially split at 60 and includes a screw or post hole 62 disposed along split 60. A screw or post (not shown) having a diameter larger than that of hole 62 is threaded/inserted into hole 62 to cause mount 58 to expand and engage the inside walls of housing 12 thereby holding the mounting assembly and its electrode in place.

The advantages of the present invention are numerous. The IR light generating system is a simple and inexpensive approach to the generation of sustained IR light in the far-infrared to mid-infrared spectral range. Accordingly, the present invention is a promising tool in the field of infrared microscopy and spectroscopy including S-SNOM measurements of solid materials. Moreover, the present invention can be also be used in conventional microscopy and spectroscopy experiments such as Fourier transform infrared (FTIR) spectroscopy and ellipsometry where the IR light generating system's high spectral radiance in the terahertz, far-infrared, and mid-infrared spectral ranges will lead to improvement in the signal-to-noise ratio of collected data.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

We claim:

1. A system for generating infrared light, comprising:

a sealed housing;

a noble gas filling said housing;

a window disposed in a wall of said housing, said window being transparent to infrared radiation;

a pair of electrodes disposed in said housing and aligned along a common longitudinal axis adapted to be approximately perpendicular to a local force of gravity, wherein a gap is defined between said electrodes along said longitudinal axis, said gap having a length;

at least one obstruction disposed in said housing adjacent to said gap and extending along said length thereof, said at least one obstruction spaced apart from said electrodes and defining a convection space between said electrodes, said convection space having a dimension measured perpendicular to said longitudinal axis, said dimension being in the range of 2 to 20 times said length; and an electric current source coupled to said electrodes.

2. A system as in claim 1, wherein said housing is thermally-conductive.

3. A system as in claim 2, further comprising:

a first mount for thermally coupling a first of said electrodes to said housing; and a second mount for thermally coupling a second of said electrodes to said housing.

4. A system as in claim 1, wherein said housing is thermally-conductive and electrically-conductive.

5. A system as in claim 4, further comprising:

a first mount for thermally coupling a first of said electrodes to said housing and for electrically insulating said first of said electrodes from said housing; and a second mount for thermally coupling a second of said electrodes to said housing and for electrically insulating said second of said electrodes from said housing.

6. A system as in claim 1, wherein said window is selected from the group consisting of diamond, potassium bromide, and zinc selenide.

7. A system as in claim 1, wherein said obstruction is coupled to said housing.

8. A system as in claim 1, further comprising a cooling system coupled to said housing.

9. A system as in claim 1, wherein said noble gas is selected from the group consisting of argon, neon, krypton, and xenon.

10. A system as in claim 1, further comprising a laser source for directing a beam of laser light through said window.

11. A system for generating infrared light, comprising:

a sealed housing made from a thermally-conductive material;

a noble gas filling said housing;

a window disposed in a wall of said housing, said window being transparent to infrared radiation;

a pair of electrodes disposed in said housing and aligned along a common longitudinal axis adapted to be approximately perpendicular to a local force of gravity, wherein a gap is defined between said electrodes along said longitudinal axis, said gap having a length;

at least one obstruction coupled to and disposed in said housing adjacent to said gap and extending along said length thereof, said at least one obstruction spaced apart from said electrodes and defining a convection space between said electrodes, said convection space having a dimension measured perpendicular to said longitudinal axis, said dimension being in the range of 2 to 20 times said length; and an electric current source coupled to said electrodes.

12. A system as in claim 11, further comprising:

a first mount for thermally coupling a first of said electrodes to said housing; and a second mount for thermally coupling a second of said electrodes to said housing.

13. A system as in claim 11, wherein said thermally-conductive material is electrically-conductive.

14. A system as in claim 13, further comprising a mount for thermally coupling each of said electrodes to said housing and for electrically insulating each of said electrodes from said housing.

15. A system as in claim 11, wherein said window is selected from the group consisting of diamond, potassium bromide, and zinc selenide.

16. A system as in claim 11, further comprising a jacket disposed about said housing, said jacket adapted to support a flow of a cooling fluid between said jacket and said housing.

17. A system as in claim 11, wherein said noble gas is selected from the group consisting of argon, neon, krypton, and xenon.

18. A system as in claim 11, further comprising a laser source for directing a beam of laser light through said window.

19. A system for generating infrared light, comprising:

a sealed metal housing;

a noble gas filling said metal housing;

a window disposed in a wall of said metal housing, said window being transparent to infrared radiation;

a pair of electrodes disposed in said metal housing and aligned along a common longitudinal axis adapted to be approximately perpendicular to a local force of gravity, wherein a gap is defined between said electrodes along said longitudinal axis, said gap having a length;

a first mount for thermally coupling a first of said electrodes to said metal housing and for electrically insulating said first of said electrodes from said metal housing;

a second mount for thermally coupling a second of said electrodes to said metal housing and for electrically insulating said second of said electrodes from said metal housing;

at least one obstruction disposed in said metal housing adjacent to said gap and extending along said length thereof, said at least one obstruction spaced apart from said electrodes and defining a convection space between said electrodes, said convection space having a dimension measured perpendicular to said longitudinal axis, said dimension being in the range of 2 to 20 times said length; and an electric current source coupled to said electrodes.

20. A system as in claim 19, wherein said window is selected from the group consisting of diamond, potassium bromide, and zinc selenide.

21. A system as in claim 19, further comprising a jacket disposed about said metal housing, said jacket adapted to support a flow of a cooling fluid between said jacket and said metal housing.

22. A system as in claim 19, wherein said noble gas is selected from the group consisting of argon, neon, krypton, and xenon.

23. A system as in claim 19, further comprising a laser source for directing a beam of laser light through said window.

* * * * *